INVENTOR.
HERMAN V. STEWART
BY
Campbell, Brumbaugh & Free
HIS ATTORNEYS.

INVENTOR.
HERMAN V. STEWART
BY
Campbell, Brumbaugh & Free
HIS ATTORNEYS.

Nov. 18, 1952 H. V. STEWART 2,618,250

INTERNAL-COMBUSTION ENGINE

Filed Oct. 12, 1946 9 Sheets-Sheet 3

*INVENTOR.*
HERMAN V. STEWART

*BY*

Campbell, Brumbaugh & Free
*HIS ATTORNEYS.*

Nov. 18, 1952 H. V. STEWART 2,618,250

INTERNAL-COMBUSTION ENGINE

Filed Oct. 12, 1946 9 Sheets-Sheet 4

INVENTOR.
HERMAN V. STEWART
BY
Campbell, Brumbaugh & Free
HIS ATTORNEYS.

Nov. 18, 1952 H. V. STEWART 2,618,250

INTERNAL-COMBUSTION ENGINE

Filed Oct. 12, 1946 9 Sheets-Sheet 5

INVENTOR.
HERMAN V. STEWART

BY

Campbell, Brumbaugh & Free

HIS ATTORNEYS.

Nov. 18, 1952 H. V. STEWART 2,618,250

INTERNAL-COMBUSTION ENGINE

Filed Oct. 12, 1946 9 Sheets-Sheet 6

INVENTOR.
HERMAN V. STEWART

BY

Campbell, Brumbaugh & Free
HIS ATTORNEYS.

Nov. 18, 1952 H. V. STEWART 2,618,250
INTERNAL-COMBUSTION ENGINE
Filed Oct. 12, 1946 9 Sheets-Sheet 7
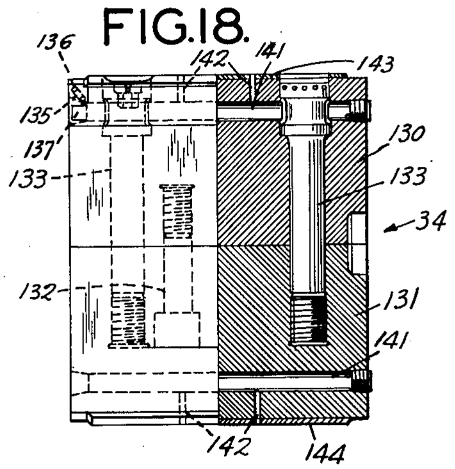
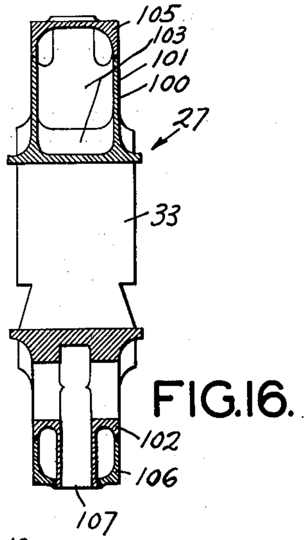
FIG.17.
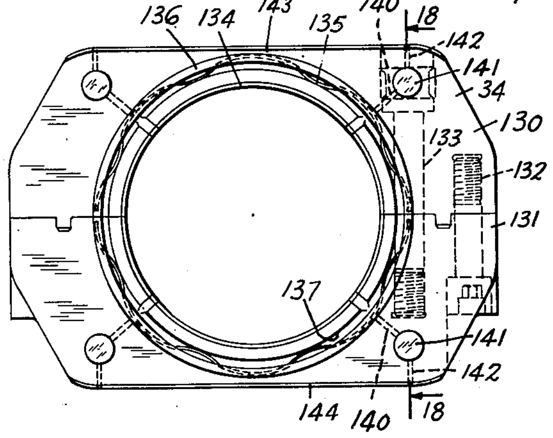
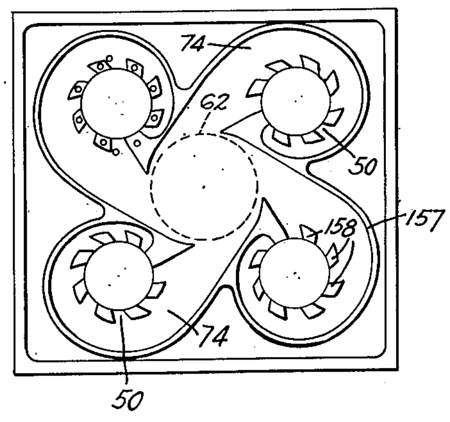
FIG.10.
*INVENTOR.*
HERMAN V. STEWART
*BY*
Campbell, Brumbaugh & Free
HIS ATTORNEYS.

INTERNAL-COMBUSTION ENGINE

Filed Oct. 12, 1946 9 Sheets-Sheet 8

INVENTOR.
HERMAN V. STEWART
BY
Campbell, Brumbaugh & Free
HIS ATTORNEYS.

INVENTOR.
HERMAN V. STEWART
BY
Campbell, Brumbaugh & Free
HIS ATTORNEYS.

Patented Nov. 18, 1952 2,618,250

UNITED STATES PATENT OFFICE 2,618,250

INTERNAL-COMBUSTION ENGINE

Herman V. Stewart, Glendale, Calif.

Application October 12, 1946, Serial No. 702,899

3 Claims. (Cl. 123—56)

This invention relates to improvements in internal combustion engines, and it relates particularly to internal combustion engines of the compression-ignition type which may be used in aircraft, locomotives or for other purposes requiring a large power output and relatively low weight.

An object of the present invention is to provide a two-cycle compression-ignition engine of large power output.

Another object of the invention is to provide a compression-ignition engine of two-cycle type to which air for the combustion process is supplied under pressure to provide an increased power output.

A further object of the invention is to provide a two-cycle compression-ignition engine of opposed cylinder type.

And an additional object of the invention is to provide an H type engine in which the inertia forces of a simplified simple harmonic motion mechanism combat combustion loads for normally low crankpin and crankshaft bearing pressures despite relatively high combustion loads.

A still further object of the invention is to provide a compression-ignition engine having improved cooling means for dissipating the energy produced by the combustion of fuel in the cylinders of the engine.

Another object of the invention is to provide a two-cycle engine of a sleeve valve type having sufficiently high compression for compression-ignition.

A further object of the invention is to provide a compact, supercharged compression-ignition engine.

Another object of the invention is to provide a compact compression-ignition engine having a multiplicity of cylinders arranged in H formation.

Other objects of the invention will become apparent from the following description of a typical form of engine embodying the present invention.

In accordance with the present invention, I have provided a compression-ignition engine in which the cylinders are arranged in a generally H shape, that is, the crankcase carries at least one pair of cylinders in opposition to another pair of cylinders, thereby producing the so-called H type of engine. As many groups of four cylinders in H formation as desired may be used in the engine, for example, a typical engine may include sixteen cylinders in four groups of four cylinders.

The pistons in the cylinders are arranged to drive a pair of interconnected counter-rotating crankshafts mounted within the crankcase of the engine. Each corresponding pair of cranks of the crankshafts is connected by means of a transverse yoke provided with two suitable bearing openings for receiving slide blocks carried by the cranks. The piston rods are connected to the yoke and the yoke is reciprocated thereby, one pair of cylinders on one side of the crankcase being fired simultaneously and alternately with the opposing pair of cylinders. This overcomes any tendency of the yoke to rotate in its plane of reciprocation.

Each of the cylinders is provided with a suitable sleeve valve in which the piston reciprocates. The sleeve valve is operated in timed relationship to the piston by means of an eccentric driven by the crankshaft at crankshaft speed. The eccentric preferably engages a stub shaft carried by the sleeve. As the sleeve valve is driven by the eccentric, it is given an elliptical motion in timed relationship to the piston to permit the introduction of air and to permit the discharge of the combustion products in proper timed relation for two-cycle operation.

The cylinder heads are provided with fuel injecting nozzles of conventional type and air for the combustion process is supplied by means of a supercharger either in conjunction with, or without, a displacement blower which maintains a positive pressure at the intake ports of the cylinders so that more thorough scavenging of the exhaust gases and a positive supply of air at super-atmospheric pressure is provided.

Due to the fact that air under pressure is supplied to the cylinders for combustion of the fuel, relatively high cylinder temperatures are produced which necessitate the provision of cooling means, particularly for regions near the centers of the piston crowns. In order to fulfill this requirement, oil is led through the stub shaft of each of the sleeve valve units into the hollow piston rod through a series of passages in the wall of the piston rod. Circulation to and from a cavity provided within the piston for cooling purposes is produced by use of inertia forces together with an "overflow" principle to be described subsequently in detail.

The above-described construction makes for a very compact and relatively light weight engine of large power output. It permits such elements as superchargers to be mounted as parts of the engine assembly rather than at positions remote from the engine assembly. Furthermore, with a centrifugal compressor installed in each cylinder block of four cylinders with each cylinder approximately equidistant from the centerline of the compressor and with intake ports located approximately in line with the path of the air leaving the compressor, relatively high intake port volumetric efficiency may be attained. Moreover, the air distribution to the four cylinders is equalized assuring more uniform combustion of the fuel in the cylinders. Moreover, the weight of the engine can be reduced for the reason that many structural elements such as yoke and crosshead guides are largely eliminated.

For a better understanding of the present invention, reference may be made to the accompanying drawings in which, Figure 1 is a plan view of a typical internal combustion engine embodying the present inventions;

Figure 10 is a view from the side opposite that shown in Figure 6 (without the cylinder block support in place), showing the cylinder intake passages and ports.

Figure 16 is a view in cross section, taken on line 16—16 of Figure 12;

Figure 17 is a side view of a typical slide block or crankpad for connecting the yoke and the crankshaft;

Figure 18 is a plan and partly sectional view of the slide block;

Figure 1:
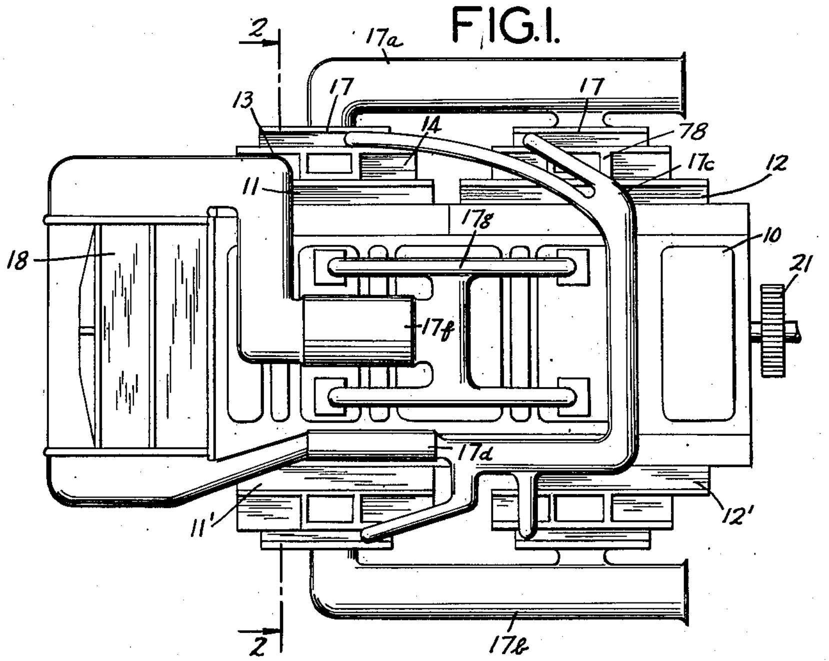
Figure 2:
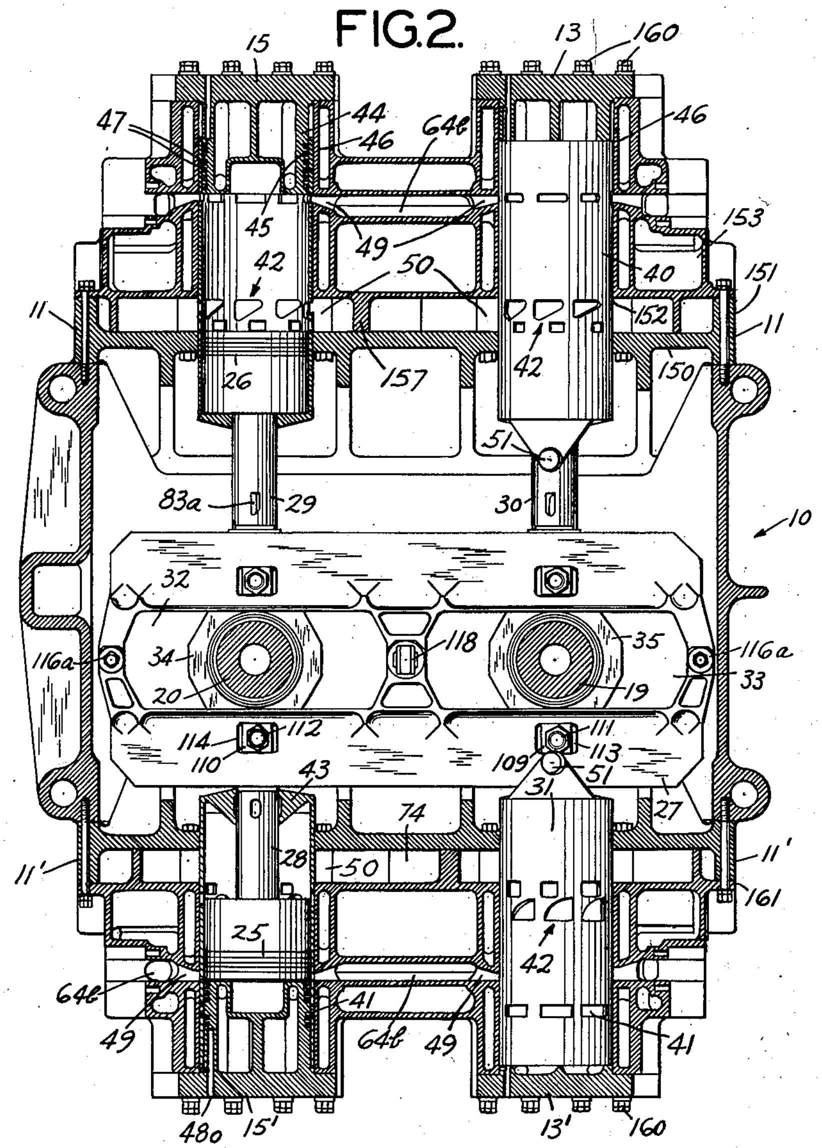
Figure 2 is a view in section taken on line 2—2 of Figure 1 with parts of the device removed for purposes of clarity.
Figure 6:
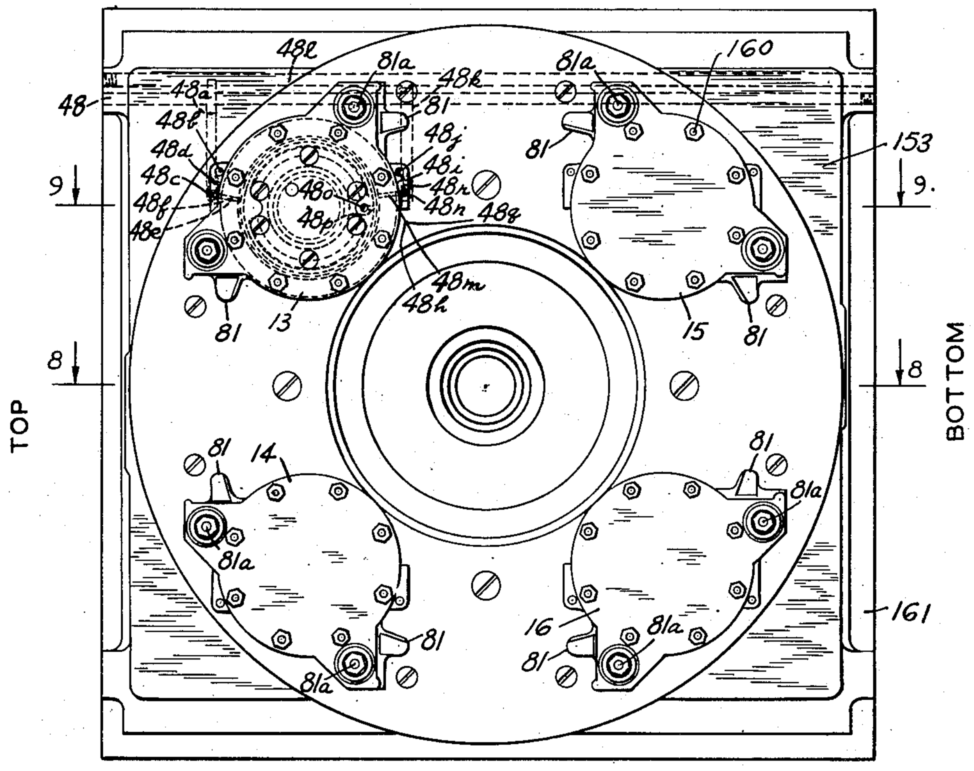
Figure 6 is a view in elevation, of a typical cylinder block and head assembly for the engine.
Figure 14:
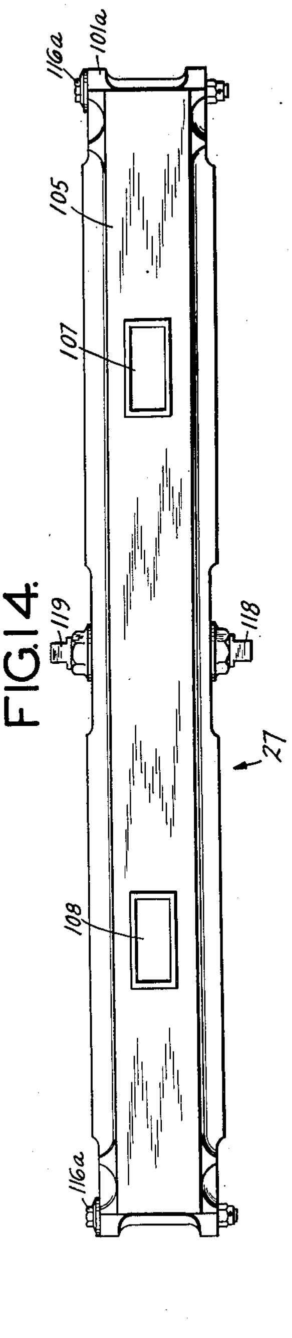
Figure 14 is a view in elevation of yoke of Figure 12.

The form of engine chosen for purposes of illustration is a two-cycle sleeve valve, sixteen-cylinder engine. This engine comprises, as shown in Figure 1, a crankcase portion 10 on which are mounted the cylinder supports 11 and 12 and 11' and 12' which carry the cylinders of the engine. The cylinders 13, 14, 15 and 16, Figures 1, 2 and 6, are mounted in a group of four on the support 11 for example. Thus, as shown in Figures 1, 2 and 6, the engine includes four groups of four cylinders each, with two of these groups being mounted on each side of the crankcase so as to produce a symmetrical construction.

Each group of four cylinders is provided with a supercharger 17 which supplies air under pressure to all four of the cylinders of the group. As shown in Figure 1, each supercharger is mounted in about the center of each group of cylinders so that the cylinders of each group are symmetrically positioned around one supercharger. With a centrifugal compressor thus located centrally of each group of four cylinders and immediately adjacent to the intake ports of said cylinders, air leaving this compressor with high velocity is forced directly into the intake ports of the cylinders by virtue of its high velocity energy, that is, immediately upon opening of the intake ports. This action is in contrast to the usual compressor arrangement wherein the kinetic energy of the air leaving the compressor is transformed to pressure energy within a relatively large-volume intake conduit or passage, thereafter to be retransformed into kinetic energy as the intake ports are opened and air enters the cylinders. Inasmuch as the time period allotted for scavenging and supercharging is extremely short for a high speed, two-cycle engine, the substantial elimination of the energy transformation process for a large portion of the scavenging and supercharging air increases the volumetric efficiency of the induction system.

In the engine illustrated, the superchargers 17 include two compressor stages driven by an exhaust turbine, later to be described. Air enters the first stage through the air intake manifolds 17a, 17b, is compressed and delivered through the manifold 17c, the intercooler 17d to the "Roots" blower 18 where it is compressed as necessary by regulation of the blower by-pass 18a, shown in Fig. 4. It is then discharged through a second intercooler 17f, if desired, to a single generally H-shaped manifold 17g to the second stage of each of the superchargers. This arrangement assures substantially equal delivery of air to all of the cylinders, regardless of individual variations in the action of the compressors.

Figure 4:
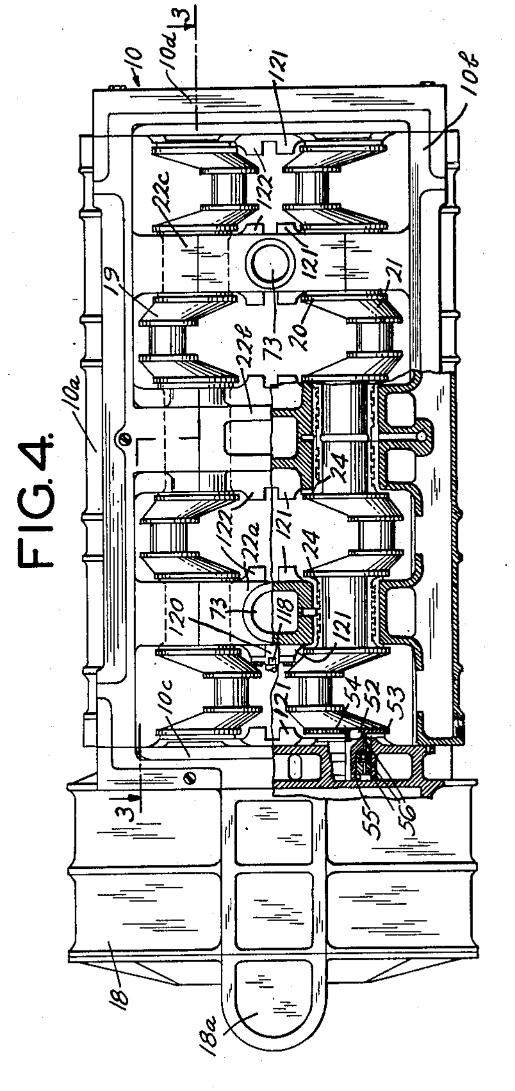
Figure 4 is a view in side elevation and partly in section, of the crankcase of the engine.

As shown in Figures 2 and 4, the crankcase contains two crankshafts 19 and 20 which are connected by means of suitable gearing 21 (Figure 1) to cause them to rotate counter to each other. The crank shafts 19 and 20, as best shown in Figure 4, are supported in bearing webs 22a, 22b, and 22c extending between the walls 10a and 10b of the crankcase 10. The crankcase is preferably designed with crankshaft supporting webs 22a, 22b and 22c extending from the walls 10a and 10b to the centerlines of the adjacent crankshafts. The portions of the webs between the crankshafts are separate parts which are secured to the main walls 10a and 10b by means of bolts, not shown, or in any other suitable way. This separation of the parts is necessary for installing the crank shafts. The crankcase end sections 10c and 10d are also bolted to the walls 10a and 10b to form a rigid structure. This rigidity is further increased by the attachment of the cylinder supports 11, 12, 11' and 12'.

The bearings 24 for the crankshaft may be of conventional type and are split at right angles to the joining surfaces of the bearing supporting webs 22a, 22b, and 22c.

The crankshafts 19 and 20 rotate in opposite directions and carry the impellers, not shown, of the "Roots" blower 18.

Referring now to Figure 2, it will be clear that the cylinders 13, 14, 15 and 16 of one group of cylinders on one side of the crankcase 10 are in alignment with and opposed to a similar group of cylinders which are identified by the same primed reference characters on the opposite side of the crankcase, so that the pistons reciprocating therein travel along parallel lines and the pistons in opposing cylinders, 13, 13' for example, are in substantially axial alignment. In order to transmit reciprocation of the pistons 25 and 26 and the corresponding pistons in the cylinders 13, 13' to the crankshafts, I have provided a coupling yoke 27 which is connected to the piston rods 28, 29, 30 and 31 of the aligned bank of four cylinders. This yoke 27, which will be described hereinafter in greater detail, is provided with bearing openings 32 and 33 for receiving slide blocks or crankpad members 34 and 35 which are mounted on the cranks of the crankshafts 19 and 20. Thus, when both of the cylinders 13 and 15 on one side of the engine are fired simultaneously, the yoke will move toward the opposite bank of cylinders, thereby rotating the crankshafts in opposite directions. When the cylinders 13' and 15' at the opposite side of the engine are then fired, the yoke 27 is driven in the opposite direction to continue the rotation of the crankshafts. By use of a double yoke with counter-rotating crankshafts, the moment or couple produced upon one side of the yoke by the combination of gas pressure force and inertia forces are opposed by an equal and opposite moment similarly produced upon the opposite side of the yoke. In other words the turning moment or torque upon each crank interconnected by the yoke is reacted entirely by bending within the yoke frame. Thus no external pads bearing upon the yoke are necessary to oppose the above torques and at the same time there is very little tendency for the yoke to tilt out of its vertical position in the plane of its reciprocation, i. e., to rotate in its plane of reciprocation. The yoke is held in its plane of reciprocation by means of the piston rods 28, 29, 30 and 31 which in turn are stabilized by the piston-sleeve bearing surfaces together with the piston rod-sleeve bearing surfaces, later described herein.

Figure 19:
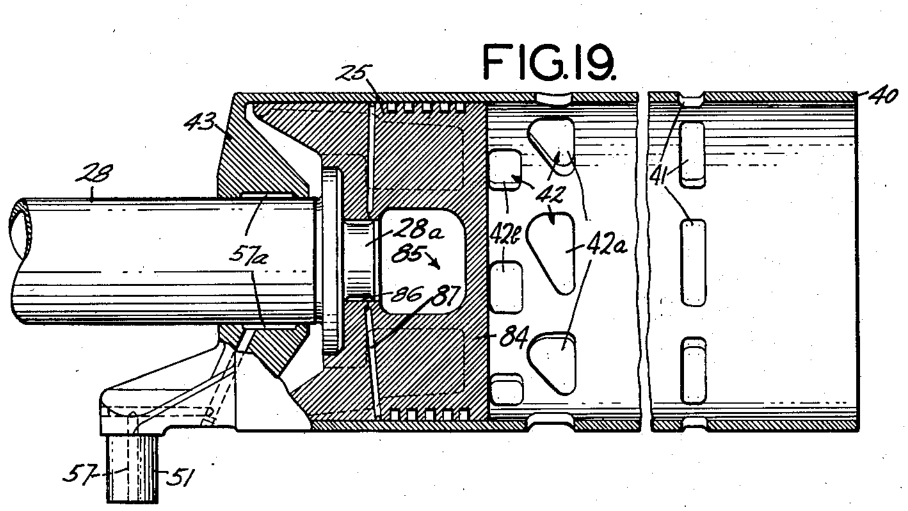
Figure 19 is a view in cross section showing a typical piston, piston rod, oil retainer, and sleeve valve assembly of the engine.

As indicated above, the engine described herein is a two-cycle sleeve valve engine and therefore, as shown in Figures 2 and 19, each of the cylinders, for example cylinder 15, is provided with a tubular sleeve valve 40. This sleeve valve is provided with a series of exhaust ports 41 near its outer end; a series of intake ports 42 near its inner end, as illustrated in Figure 19. The sleeve 40 has a bottom end closure 43 having an opening in which the piston rod 29 reciprocates and is guided. This guiding action, in addition to the guiding action of the pistons in the cylinders acts to maintain the yoke 27 in its plane of reciprocation.

As shown in Figure 2, the cylinder 15 is a composite structure having a removable cylinder head 44 of the "Ricardo" type having an inwardly extending hollow junk head portion 45 that is spaced from the wall 46 of the cylinder 15 thereby providing a space for receiving the upper end of the sleeve 40. The cylinder head 44 and the cylinder wall 46 are hollow, as illustrated, for purposes of cooling. The cooling system is not described herein in detail inasmuch as the cooling system is susceptible to some modification and does not form a part of the present invention.

The cylinder junk head 44 may be provided with suitable junk head rings 47 forming a compression seal with the sleeve 40.

Figure 7:
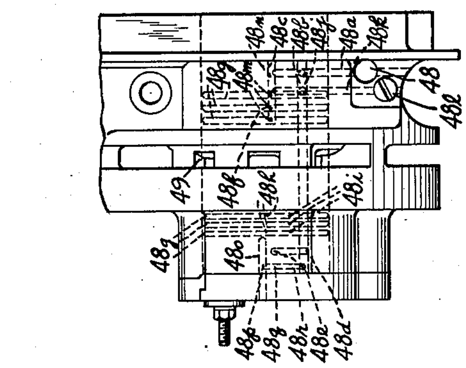
Figure 7 is a plan view of a portion of a typical cylinder block assembly.
Figure 9:
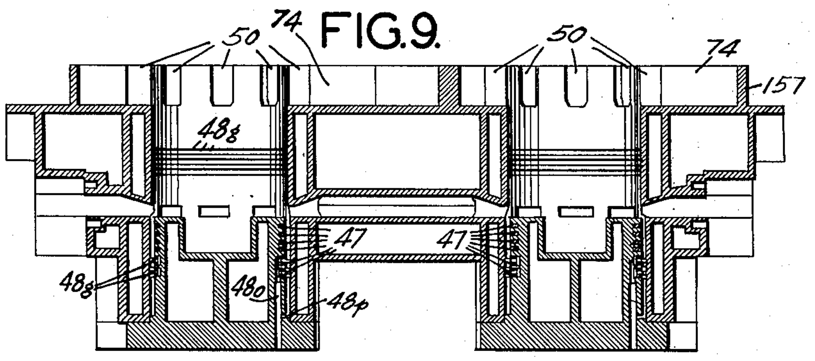
Figure 9 is a view in cross section taken on line 9—9 of Figure 6.

Figures 6, 7 and 9 disclose a typical system for lubricating the sleeve-cylinder bearing surfaces and the sleeve-junk head bearing surfaces of cylinder 13. In this system, oil enters the main drilled oil passage 48, flows through drilled passages 48*a*, 48*b*, 48*c* and 48*d*, all of which are plugged at their appropriate ends to prevent leakage. The passages 48*e* and 48*f* direct the lubricant to the cylinder walls above and below the exhaust ports. Oil for lubrication of sleeve-junk head bearing surfaces is delivered from the conduit 48*e* as permitted by the movement of the sleeve. The oil is distributed over the cylinder surfaces and junk head surfaces by means of the swept elliptical motion of the sleeve. The excess oil trapped within the annular grooves 48*g* is drained by gravity, with or without aid of a system suction pump, through the drilled passages 48*h* and 48*m*. Drainage oil from above the exhaust ports in the region of the junk head passes from the passages 48*h* by way of the passages 48*i*, 48*j* and 48*k* to main oil drainage passage 48*l*. Drainage oil from below the exhaust ports passes by way of the passages 48*m*, 48*n* and 48*k*, and finally to the main drainage passage 48*l*. Excess oil trapped behind the scraper rings of the junk head is permitted to drain by gravity, with or without the aid of the aforementioned system suction pump, through passages 48*o*, 48*p*, 48*q* and 48*r* to 48*j* thus joining the general drainage system; passages 48*i*, 48*j*, 48*k*, 48*l*, 48*n*, 48*o* and 48*r* are also plugged at their appropriate ends to prevent leakage. By governing the oil supplied to an amount very little more than is necessary for adequate lubrication and by use of the above drainage system for excess oil, it is expected that oil consumption will be kept lower than is the usual case with the use of sleeve valves.

As shown in Figure 2, when the sleeve 40 is in its outermost position, the sleeve valve exhaust ports 41 are out of alignment with the exhaust passage 49 and the intake ports 42 are out of alignment with the air intake passage 50.

Figure 5:
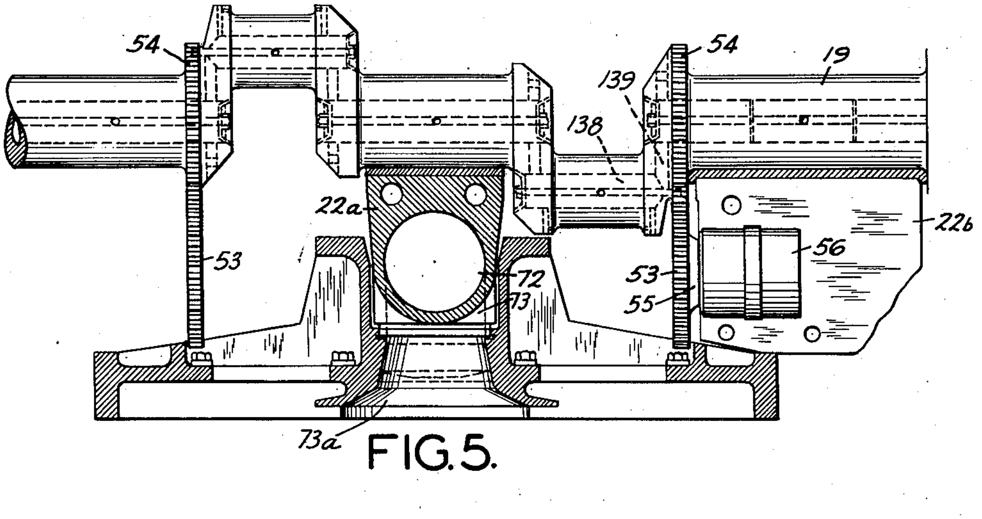
Figure 5 is a view in section taken along the centerline of the crankshaft illustrating the crankshaft in typical relationship to the crankcase bearings, sleeve drive, centrifugal compressor intake, cylinder support, and cylinders.

The sleeve 40 in each cylinder is provided with an outwardly projecting stub shaft 51 secured to the inner end of the sleeve valve 40. The stub shaft 51 is received in a bearing which, in turn, is provided with a spherical surface seated in an opening 52, Figure 4, eccentric to the axis of a gear 53, which is driven by means of a gear 54 fixed to the crankshaft or formed thereon, as shown in Figure 5. The gear 53 is a part of a hollow shaft 55 which rotates within suitable bearings 56 which in turn are housed, in this particular case for illustration, within end wall 10*c* of the crankcase assembly as shown in Figure 4. Oil may be directed through the hollow shaft 55 from oil lines drilled in the walls of the crankcase through the passage 57 in the stub shaft 51 to the oil reservoir 57*a* formed within the sleeve-piston rod bearing surface. Lubrication of bearings 56, spherical bearing of opening 52, stub shaft 51 and of sleeve-piston rod bearing is maintained by oil from these passages. Sleeve and piston lubrication and piston cooling are also provided for by flow through these passages. Oil circulation for the latter purposes will be described subsequently.

The relative timed operation of the piston and the sleeve in each cylinder will now be described. By suitably relating the position of the socket 52 with the position of the crank for the cylinder under consideration, the sleeve valve 40 may be actuated with its surfaces performing an elliptical movement such that proper timing of the opening and closing of the ports 41 and 42 to exhaust passages 49 and intake passages 50 respectively with relation to the position of the piston, may be obtained.

During assembly of the engine the crankshafts may be turned to a suitable point of rotation. Such a position having been checked, together with the directions in which the crankshafts will be turned during operation of the engine, the sleeve drive gear for each cylinder is set into position. This position is such that the eccentric hole 52 of each drive gear is some degrees in advance of the position of the crankpin for the corresponding cylinder, this "advance" given with due regard to the operating direction of rotation of the drive gear, observable from the gearing to the crankshaft and the crankshaft's operating direction of rotation. Thus, for example, with the crank location at top dead center, the sleeve-drive gear 53 is intermeshed with its driver gear 54 so that the eccentric hole of the sleeve-drive gear 53 is some degrees past its top dead center position with respect to the given corresponding cylinder axis. By use of this "advance" of the sleeve drive gear the exhaust ports of the sleeve may be controlled as to their point of opening and closing, entirely by the immediately adjacent inner edge of the cylinder junk head 44. The point of opening of the exhaust ports 41 in degrees before bottom dead center of the crankpin need not correspond with the point of closing of the said ports in degrees after bottom dead center. For instance with a 20° "advance" the exhaust ports may be designed to open when the crankpin is 80° before bottom dead center on the combustion stroke, and to close when the crankpin is 40° after bottom dead center on the compression stroke. Thus the exhaust timing may be set to open early during the combustion stroke and close early during the compression stroke, moreover, this sought-for requirement is fulfilled simply, without resort to exhaust ports or cylinder junk head inner surfaces which are specially bevelled and shaped to fulfill this requirement. The optimum amount of sleeve "advance" may vary for different engines and is largely dependent upon its operating R. P. M. and its degree of supercharging.

The elliptical motion of the sleeve 40 also brings the intake ports 42 into alignment with the intake passages 50 so that air for scavenging and for the subsequent combustion process enters the cylinder as soon as the edge of the crown of piston 25 clears the tops of the group of larger intake ports 42*a* on the downward or combustion stroke. This is timed to occur somewhat after the opening of the exhaust ports to allow the cylinder combustion gas pressure to fall approximately to the pressure assigned for driving the exhaust gas turbine, this pressure in turn being somewhat below the cylinder intake air pressure. Upon opening of the ports 42 intake air forces exhaust gases through ports 41. Eventually, when the piston is moving back upon its compression stroke the exhaust ports 41 close, after which the intake ports 42 close. The group of larger intake ports 42*a* is port controlled while the group of smaller intake ports 42*b* is piston controlled. By use of this double set of intake ports 42*a* and 42*b* in conjunction with the aforementioned sleeve "advance," large intake port areas are obtainable for fast gas-air transferal. Since a large portion of the exhaust gas leaves the cylinder immediately after opening of the exhaust ports, these need not be so large as the intake port areas. For illustration of the use of the aforementioned sleeve "advance," if the sleeve 40 is given a 20° advance, the sleeve intake ports 42 may be located and shaped to open at a desired interval after the exhaust ports have opened, for instance when the crankpin is at 60° before bottom dead center on the combustion stroke. Also, they may be designed to close when the crankpin is, for instance, at 55° after bottom dead center on the compression stroke. For both the opening and closing periods one of the sets of intake ports 42*b* is piston controlled. Due to the large movement of the piston for each degree interval in these regions, large intake port areas are obtainable immediately after opening and immediately before closing of the intake ports. Moreover, such piston control of the intake ports is obtainable without the timing of opening and closing being symmetrical with the bottom dead center position of the piston, and without use of a specially shaped piston crown for achieving such unsymmetrical timing. Furthermore large port areas particularly for the regions immediately following opening and before closing are obtainable without undue sacrifice to the strength of the sleeve, as would be the case if sleeve ports 42 were spaced excessively close together around its circumference. Thus by use of the sleeve "advance," intake port timing is less restricted and simultaneously large port areas are obtainable without introducing manufacturing and structural difficulties.

After the air thus introduced to each cylinder has been compressed by the outward movement of the piston, a charge of fuel may be introduced into the interior of the cylinder through a fuel injection nozzle, not shown, and ignition of the fuel may take place due to the heat of compression. This combustion period occurs when the piston is in the vicinity of its top dead center position and is repeated each time the piston reaches this position. This sequence of operation follows the principle of the "two cycle" engine.

It will be understood that the preceding description of the firing of one cylinder applies to the operation of all of the cylinders and that the cylinders are fired in pairs so as to produce, in effect, eight-cylinder operation with the above-described sixteen-cylinder engine.

Figure 3:
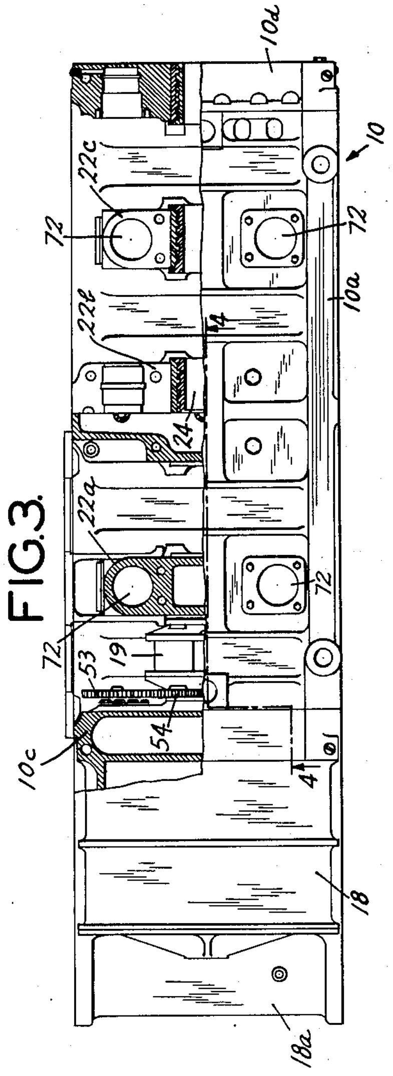
Figure 3 is a plan view of the crankcase of the engine shown partly in section, to disclose details of the main heavy supports.
Figure 11:
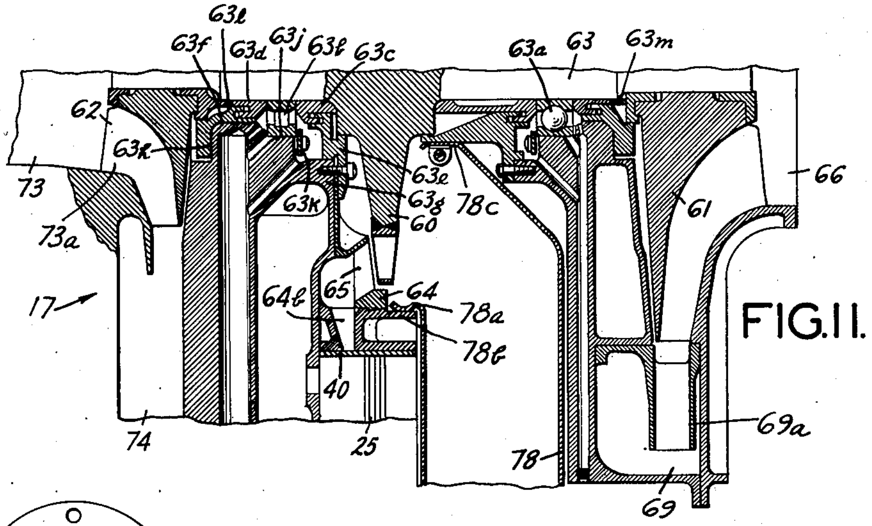
Figure 11 is a view in composite cross section and partly broken away of the turbo supercharger for the engine.

Referring now to Figure 11 of the drawings, for the disclosure of the supercharger, it will be seen that the supercharger includes a turbine rotor 60, a first stage centrifugal impeller 61, and a second stage centrifugal impeller 62, all mounted in alignment on common freely-rotating shaft 63. The turbine rotor 60 is arranged adjacent to an annular ring member 64 threaded into a recess 64*a* (Figure 8) in the cylinder block assembly adjacent to the exhaust passages 49. The member 64 is provided with a ring of nozzle type openings 65 for expansion of the exhaust gas and for directing same upon the turbine buckets. The space 64*b*, as shown best in Figures 2 and 8, communicates with all of the exhaust passages 49, for example, of the group of cylinders 13, 14, 15 and 16 so that exhaust gas is supplied from all of these cylinders for driving the turbine rotor 60. The rotation of the turbine is transmitted to the impeller 61 by means of the shaft 63 so that this impeller draws the air through its intake 66, compresses and forces it into the casing 69 of the first stage through a suitable diffuser vane structure 69*a*. The casing 69 is connected by means of the intercooler and blower system described above to the passages 72 within the bearing supporting structure best shown in Figures 3 and 5. The passages 72 are in the main bearing webs 22a and 22c of the crankcase 10 shown in Figures 4 and 5, and communicate with right-angularly related passages 73 in the webs 22a and 22c between the crankshaft bearings, shown in Figures 4 and 5. The passage 73, as shown in Figure 11, enters into a passage 73a formed within the cylinder support structure, which passage expands in size and is specially designed to accommodate the impeller 62 of the second stage centrifugal compressor, whose intake lies between the two crankshafts. The impeller 62 further compresses the air and directs it into the scroll-like passages 74, Figures 8, 9 and 10, which communicate with the air intake passages 50 referred to above. The position of the impeller 62 is indicated by dotted lines in Figure 10. With this induction system, the air is first compressed by the first stage centrifugal compressors, then if necessary it goes through an intercooler common to all the first stage compressors, thence to a displacement Roots type blower for further compression of varying degree as necessary, thence through a second intercooler, after which its flow is divided to be delivered through the crankcase to the second stage centrifugal blower of each group of four cylinders, where it is further compressed and delivered through the scroll-like passages 74 to the four cylinders of each group. Each of the four groups of cylinders is provided with a separate turbo supercharger 17, with a common ducting system between them as described above, so as to assure delivery of air at relatively uniform pressure to each of the cylinders of the engine.

It is understood that the above induction system is a complex type that may be required for high altitude aircraft. For engines designed for use at low altitude or on the ground the system may be greatly simplified. As an extreme in simplification, depending upon the engine's designed degree of supercharging and upon the presence of an auxiliary air supply for starting purposes, the induction system may consist only of the second stage centrifugal compressors with ducting through the crankcase thereto.

The exhaust gases, after passing through the turbine rotor 60 are discharged through manifolds 78 having a ring-like wall 78a mating with a similar ring 78b cut within the group of four cylinders, and having passages between the cylinders for directing exhaust gases out to common exhaust pipes for the engine. A second inner ring 78c is provided, mating with part of the first stage compressor casing assembly, to prevent leakage in this region.

It will be understood that the elements of the supercharger described above will be mounted in suitable anti-friction bearings and that suitable lubricant conveying passages will be provided for lubricating the supercharger. Figure 11 shows these parts in typical relationship with the turbo supercharger assembly.

For convenience in repairing and replacing the supercharger, the rotor elements and portions of the casing may be largely self-contained so that the unit can be removed easily. Thus, the casing 69 for the first stage is disposed outside of the cylinder heads and is retained in position by means of suitable flanges 81, Figure 6, which are fixed to the cylinders in such relationship to engage the base of the casing and hold it in alignment. The outer casing is fixed in this position by means of studs 81a.

This also permits the proper disposition of the second stage impeller 62 in the passage 73a and flange 73b which are formed as an integral part of the cylinder block. Impeller disposition axially is adjusted by use of proper length spacers, 63l and 63m.

Figure 8:
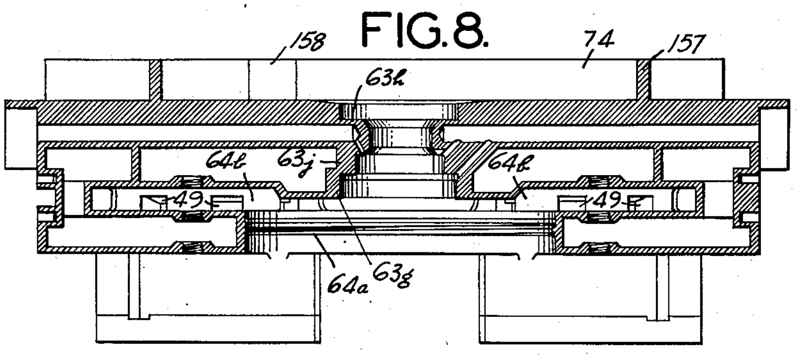
Figure 8 is a view in cross section taken on line 8—8 of Figure 6.
Figures 20, 21, 22:
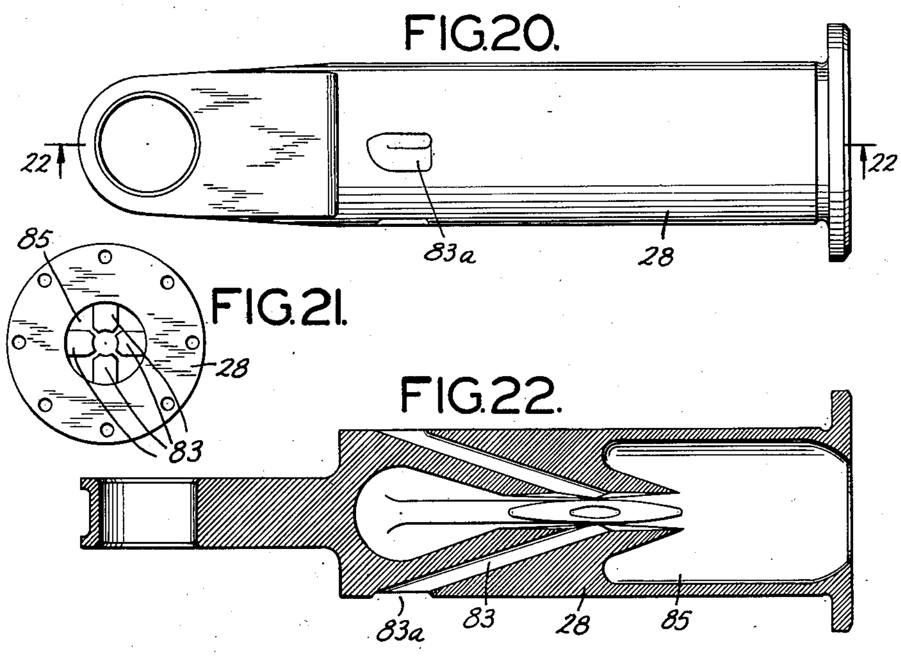
Figure 20 is an elevation view of the piston rod.
Figure 21 is an end view of the piston rod.
Figure 22 is a view in cross section taken on line 22—22 of Figure 20.

The shaft 63 may be suitably supported in a bearing 63a mounted between the shaft 63 and a bearing housing as part of the casing 69. A lower bearing 63b for the shaft is mounted between the turbine rotor 60 and the second stage impeller 62 by means of suitable spacers 63c and 63d on the shaft. These spacers have flanges engaging in grooves in supporting elements 63e and 63f respectively which engage and are bolted to the shoulders 63g and 63h formed in the cylinder block (Figures 8 and 11). The bearing 63b is received in a recess 63j and is retained there by a retaining ring 63k. Suitable oil passages may be provided for lubricating the bearings 63a and 63b, as also shown compositely in Figure 11. The details of these features and of the gas sealing labyrinths also used as a means of retaining the bearings axially are susceptible to some modification. However, the preferred arrangement of the composite parts is as shown in Figure 11, to permit assembly of the turbo supercharger unit within the cylinder block.

Due to the fact that the engine is a two-cycle type and air for combustion of fuel is supplied under pressure, a great deal of heat is generated within the cylinders, and unless the pistons were cooled, they would be burned and damaged. The pistons may be cooled by means of the following construction.

Referring now to Figures 3, 4, 19, 20, 21, 22 and 23, and as indicated before, lubricating oil is conducted through passages drilled in the crankcase, through the hollow shafts 55 of each sleeve drive gear unit, thence through the stub shaft 51 of each of the sleeve drive units into a chamber 57a provided within the sleeve-piston rod bearing surface of each sleeve unit. Oil is delivered from this chamber 57a into the hollow piston rod 28 through a series of passages 83 in the wall of the piston rod 28. Oil flow into the piston rod is assured by the combination of oil system pressure together with pressure built up within the sleeve oil passages 83 due to sleeve acceleration. Flow into the piston rod 28 is further aided by rounding off the leading edges of the entrances 83a of the piston rod passages 83, that is, the edges leading relative to the rotary motion of the sleeve when said entrances are located within the aforementioned chamber within the sleeve-piston rod bearing surface. Oil thus entering the piston rod reaches the piston crown 84 by virtue of the oil's motion in that direction together with the deceleration of the piston 25 as it approaches its top dead center position, and finally by virtue of the oppositely directed motion of the piston as it starts downward upon its power stroke. After the middle of the stroke oil leaves the piston crown due to piston deceleration and is splashed back against the opposite end of the piston rod chamber 85. At this stage the aforementioned piston rod oil entrance passages 83 are directly open to the crankcase and thus become exit passages emitting oil into the crankcase to be led subsequently to an oil cooler. With each revolution this oil flow is repeated thereby removing heat from the piston crown. The aforementioned passages 83 providing the main oil flow to and from the interior of the piston rod extend from the wall nearly to the axial center line of the piston rod 28. Termination of the inner ends in this region prevents considerable leakage from the piston rods when the engine is not in use.

Figure 23:
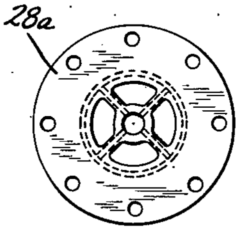
Figure 23 is a side view of an oil retainer unit for use in lubricating the piston-sleeve bearing surfaces.
Figure 12:
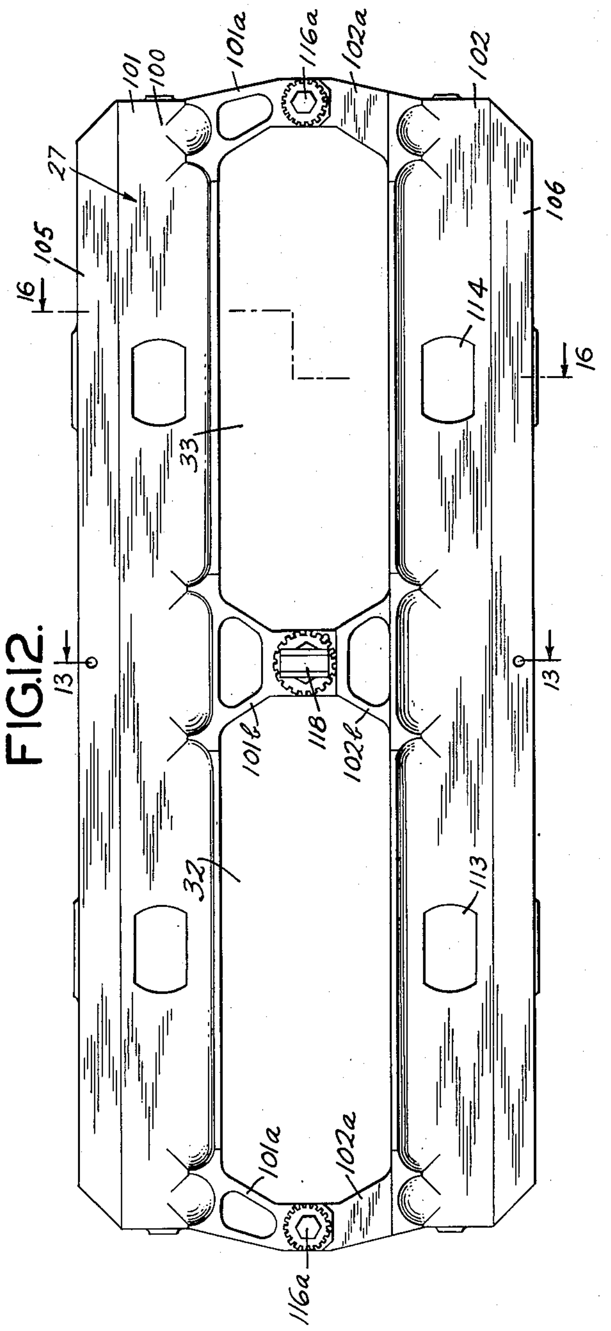
Figure 12 is a side view of a typical yoke for connecting the piston rods to the crankshafts.

Lubrication of the bearing surfaces of the piston 25 and sleeve 40 is maintained by bleeding off a quantity of the oil within the piston rod-piston assembly. Referring now to Figures 19 and 23, a quantity of the oil splashing within the piston rod and piston is trapped in the space 86, between the piston 25 and the spool-like end member 28*a* which is fixed to the end of the rod 28 and to the piston 25. Oil thus available flows through passages 87 within the piston and thence to the piston-sleeve bearing surfaces. By this means oil is fed to the bearing surfaces approximately during the period from 90° before top dead center to 90° after top dead center, and oil leakage into the sleeve intake ports therefore will be very low.

Figure 15:
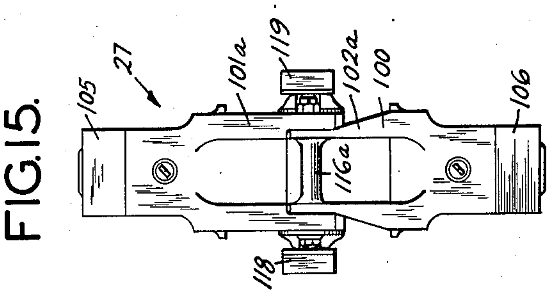
Figure 15 is an end view of the yoke.
Figure 13:
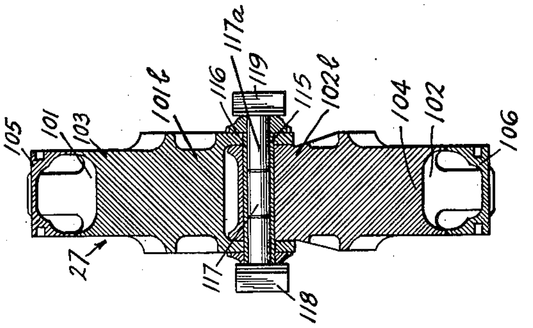
Figure 13 is a view in cross section taken on line 13—13 of Figure 12.

As indicated generally above, the described engine is provided with a rigid but not excessively heavy yoke member 27 for connecting each opposed pair of pistons to the crankshafts 20 and 21. As shown in Figures 12, 13, 14, 15 and 16, this yoke may be a composite structure of generally rectangular form and preferably of hollow construction to reduce weight without loss of rigidity. Thus, the central lengthwise extending portion 100 of the yoke may be cast or otherwise formed as two elements with outwardly opening channels 101 and 102 at opposite sides which are suitably reinforced by means of thin webs 103 and 104. These channels may be closed by opposed channel members 105 and 106 which are welded to the edges of the channels 101 and 102. The outer channels 105 and 106 are provided with generally rectangular openings 107 and 108 receiving similarly shaped extensions from 101 and 102, welded at the edges for rigidity, through which the piston rods extend. The inner ends of the piston rods are connected to bearing blocks 109 and 110 (Figure 2) by means of suitable bolts or shafts 111 and 112 preferably so room is left for movement endwise of the blocks 109 and 110 in the slots or openings 113 and 114 through the yoke to compensate for any misalignment of the cylinders with respect to the centers of the openings 113 and 114. The yoke 27 preferably is formed of two welded assemblies as described and illustrated, of which the inwardly extending end portions 101*a* and 102*a* and middle portions 101*b* and 102*b* interfit and are connected by means of bolts 116*a* and the hollow pin 116 respectively. Yoke-slide block bearing clearance adjustment is permitted by the use of the eccentric surfaces on the two bolts 116*a* and the pin 116 mated with their corresponding yoke holes. Typical eccentricities and holes are as shown in Figures 13 and 15, which permit bearing adjustment by similarly turning the bolts 116*a* and pin 116 to their appropriate positions and by locking them in place with cotter pins as shown, Figure 12. Nuts on the other ends of these elements are also locked by cotter pins.

The yoke's movement in the various planes must be controlled. As mentioned previously, any appreciable rotation of the yoke 27 about the axis of its center pin 116 is prevented by the action of the slide blocks which in turn are held in their correct respective positions by the counter-rotating intergeared crankshafts. Excessive movement endwise with respect to the engine assembly is prevented by the four attached piston rods which in turn are stabilized by piston-sleeve and piston rod-sleeve bearing surfaces. Excessive movement vertically is prevented and support for the yoke's weight is furnished respectively by use of guide bearings provided at the mid-portion of the yoke. In this region the yoke assembly pin 116, fitted in opening 115 is provided with an opening to accommodate shafts 117 and 117*a* having generally rectangular end portions 118 and 119. The ends 118 and 119 engage in suitable channel-like bearings 120 which are mounted between projecting lugs 121 and 122 on opposite sides of the main bearing webs 22*a*, 22*b* and 22*c*, as well as on the ends 10*c* and 10*d* of the crankcase 10. Thus the yoke is restricted against movement, other than simple harmonic motion, in the plane of the piston rods.

The friction between the slide blocks or crankpads 34 and 35 and the walls of the yoke 27 forming the bearing openings 32 and 33 may be reduced by a suitable force feed lubrication system. In order to facilitate the distribution of the lubricant along the bearing surfaces, the slide blocks 34 and 35 of which only the block 34 will be described hereinafter is formed of two parts, 130 and 131, which join along a longitudinal center line to produce a complete bearing block. The two parts, 130 and 131, of the slide block may be coupled by means of a plurality of bolts 132 and 133 to engage them around a given crankpin. These bolts may be locked in place by use of bent-over pins. The split bearing member 134 which may be formed of cadmium silver or other appropriate bearing material is bonded to parts 130 and 131. Similar bearing material is bonded to the outer surfaces of the numbers 130 and 131 for bearing against the yoke surfaces.

The ends of each slide block assembly 34 are specially machined to receive the split rings 136 of L shape in cross section, which in turn are pressed against the crankshaft cheeks by means of springs 135 reacting against shoulders 137 machined as extensions from parts 130 and 131. The rings 136 reduce leakage of lubricant which flows from the interior of the crank shaft through the slide block for lubrication of the yoke-slide block bearing surfaces. Oil is led from the crankshaft to the slide block-crankpin bearing and to the cavities behind the split rings 136 through the crankshaft passages 138 and 139 as shown, Figure 5. From these two cavities flow is directed through passages 140 extending radially from behind the rings 136 outwardly into communication with cross bores 141 formed adjacent the corners of the slide block. The ends of the cross bores 141 may be plugged and suitable passages 142 provided for directing lubricant outwardly to the leading edges of the flat surfaces 143 and 144 of the slide block.

While it is possible that a cylinder block and cylinder block supporting structure may be formed in one piece, I prefer to form each cylinder block and the supporting structure therefor in a plurality of pieces. Referring to Figures 2 and 6, a typical cylinder assembly may include a reinforced substantially square plate 150 having an edge flange 151 extending around the periphery which is secured to the edges of the crankcase 10. This base plate 150 is provided with openings 152 through which the sleeve valves 40 extend.

The cylinder block includes, as shown in Figure 2, a hollow jacket 153 for receiving cooling liquid by means of which coolant is conducted through the block and attaching cylinder heads. This part, if desired, may be cast as one piece.

The bottom surface of the member 153 is provided with the scroll-like flanges 157 which form the scroll-like passages 74 and the annular rings of lugs 158 forming the air intake passages 59.

The heads of the cylinders 13, 14, 15 and 16 are formed separately and all these portions of the cylinder block construction together with the cylinder block support are retained in assembled relationship by means of a plurality of bolts 160 which extend completely through the assembly.

The assembly of the cylinder block, cylinder heads, turbo unit, and cylinder block support is secured to the crankcase 10 by means of studs extending therefrom and mating with corresponding holes provided in the above assembled unit. These holes extend through the cylinder block support and through the flange 161 of the cylinder block. With the above assembly thus secured, the reactions to the cylinder block combustion loads are transferred via the cylinder block support to the crankcase walls.

Such a multi-part assembly of separate cylinder heads fastened upon each cylinder of the cylinder block is necessitated by the use of the sleeve valves 40 which valve type has been selected in order to provide uniflow scavenging of the cylinders. The combustion chamber within each sleeve valve is sealed by means of the junk head rings 47 referred to above, together with rings provided upon each piston. Tight joints between the cylinder heads and cylinders, for the prevention of coolant leakage, are assured by use of the aforementioned through bolts 160, in conjunction with suitable gasket between the heads and cylinder block, not shown.

From the preceding description of a typical form of engine embodying the present inventions, it will be clear that I have provided a compression-ignition engine in which two-cycle operation is possible and by means of which high-power output may be obtained. While the engine has been described as having sixteen cylinders, it will be understood that only two groups of four cylinders each may be included, or more than sixteen cylinders provided as desired.

Adequate provision can be made for cooling the various elements, and lubrication of the cylinders, pistons, bearings and other relatively moving parts is assured under all operating conditions. Moreover, air under pressure is uniformly supplied to all of the cylinders by means of the separate centrally located superchargers.

It will be understood that the engine is susceptible to considerable modification, particularly in the manner in which the various bearing elements are lubricated, the cylinders are cooled, and in the size and shape of the cooperating elements.

Therefore, the form of the invention described above is illustrative and should not be considered as limiting the scope of the following claims.

I claim:

1. In an internal combustion engine having at least two opposed pairs of cylinders arranged in H-formation, a pair of crankshafts between said pairs of cylinders and having cranks thereon, and pistons reciprocable in said cylinders; the combination of a generally rectangular yoke member connected to said pistons adjacent its longitudinal edges, means forming substantially parallel bearing surfaces extending longitudinally of said yoke member, means at the ends and in the middle of said yoke member for adjusting the spacing between said bearing surfaces, crank-pad blocks having bearing surfaces rotatably mounted on said cranks and external bearing surfaces slidably engaging said bearing surfaces, means for delivering oil through said crankshafts to said internal bearing surfaces, and passages extending through said blocks for delivering oil from said internal bearing surfaces to said external bearing surfaces.

2. A yoke construction for connecting the pistons in pairs of cylinders in H-formation to a pair of crankshafts, comprising a pair of longitudinally extending side members, each having transversely extending end members and at least one other transversely extending member about midway between said end members, means connecting said transversely extending members to form a generally rectangular frame having spaced apart openings therein, bearing surfaces on opposite sides of said openings, and camming means on said transversely extending members to vary the spacing between the bearing surfaces.

3. A yoke construction for connecting the pistons in pairs of cylinders in H-formation to a pair of crankshafts, comprising a pair of longitudinally extending side members, each having transversely extending end members and at least one other transversely extending member about midway between said end members, means connecting said transversely extending members to form a generally rectangular frame having spaced apart openings therein, bearing surfaces on opposite sides of said openings extending lengthwise of said side members, camming means on said transversely extending members to vary the spacing between the bearing surfaces, a shaft extending through said one other member, and means on opposite ends of said shaft for guiding said yoke.

HERMAN V. STEWART.

REFERENCES CITED

The following references are of record in the file of this patent:

UNITED STATES PATENTS

| Number | Name | Date |
|---|---|---|
| 874,200 | Hoyt | Dec. 17, 1907 |
| 1,068,781 | Knight | July 29, 1913 |
| 1,083,111 | MacConaghy | Dec. 30, 1913 |
| 1,679,491 | Pielstick | Aug. 7, 1928 |
| 1,909,729 | Southwick | May 16, 1933 |
| 1,915,284 | Becker | June 27, 1933 |
| 1,928,033 | Schaer | Sept. 26, 1933 |
| 1,961,905 | Michell | June 5, 1934 |
| 1,993,963 | Heinze | Mar. 12, 1935 |
| 2,117,700 | Burkhardt | May 17, 1938 |
| 2,137,730 | Smith | Nov. 22, 1938 |
| 2,188,630 | Grahman | Jan. 30, 1940 |
| 2,200,744 | Heinzelmann | May 14, 1940 |
| 2,217,912 | Lindsey | Oct. 15, 1940 |
| 2,290,202 | Nelson | July 21, 1942 |
| 2,230,839 | Hulsebos | Feb. 4, 1941 |
| 2,354,620 | Smith | July 25, 1944 |
| 2,395,262 | Forsyth | Feb. 19, 1946 |
| 2,507,946 | Waeber | May 16, 1950 |

FOREIGN PATENTS

| Number | Country | Date |
|---|---|---|
| 17,628 | Great Britain | Aug. 2, 1911 |
| 337,532 | France | Apr. 13, 1904 |
| 813,297 | France | Feb. 22, 1937 |
| 442,154 | Great Britain | Feb. 3, 1936 |
| 502,727 | Great Britain | Mar. 23, 1939 |
| 574,740 | Great Britain | Jan. 18, 1946 |